(12) United States Patent
Yamaguchi et al.

(10) Patent No.: US 9,733,546 B2
(45) Date of Patent: Aug. 15, 2017

(54) OPTICAL COMPONENT

(71) Applicant: NGK INSULATORS, LTD., Aichi-prefecture (JP)

(72) Inventors: Shoichiro Yamaguchi, Ichinomiya (JP); Naotake Okada, Anjo (JP); Keiichiro Asai, Nagoya (JP)

(73) Assignee: NGK INSULATORS, LTD., Aichi-prefecture (JP)

( * ) Notice: Subject to any disclaimer, the term of this patent is extended or adjusted under 35 U.S.C. 154(b) by 0 days.

(21) Appl. No.: 15/078,088

(22) Filed: Mar. 23, 2016

(65) Prior Publication Data

US 2016/0202596 A1 Jul. 14, 2016

Related U.S. Application Data

(63) Continuation of application No. PCT/JP2014/071479, filed on Aug. 15, 2014.

(30) Foreign Application Priority Data

Sep. 30, 2013 (JP) ................... 2013-204584

(51) Int. Cl.
*G02F 1/295* (2006.01)
*G02B 6/12* (2006.01)
*G02F 1/377* (2006.01)
*G02F 1/35* (2006.01)
*C04B 37/00* (2006.01)

(52) U.S. Cl.
CPC .............. *G02F 1/3775* (2013.01); *G02B 6/12* (2013.01); *G02F 1/3501* (2013.01); *G02F 1/377* (2013.01);

(Continued)

(58) Field of Classification Search
CPC ................ G02F 1/3775; G02F 1/3501; G02F 2001/3505; C04B 2237/72; C04B 2237/59; C04B 2237/592; G02B 2006/12197

(Continued)

(56) References Cited

U.S. PATENT DOCUMENTS

| 6,999,668 B2 | 2/2006 | Yokoyama et al. |
| 2003/0133680 A1 | 7/2003 | Yokoyama et al. |

(Continued)

FOREIGN PATENT DOCUMENTS

| JP | 2003-270467 A | 9/2003 |
| JP | 2003-295140 A | 10/2003 |

(Continued)

OTHER PUBLICATIONS

International Preliminary Report on Patentability for PCT Patent App. No. PCT/JP2014/071479 (Apr. 5, 2016).

(Continued)

*Primary Examiner* — Robert Tavlykaev
(74) *Attorney, Agent, or Firm* — Cermak Nakajima & McGowan LLP; Tomoko Nakajima (57) ABSTRACT

An optical component includes an optical device comprising a bonding face and an optically polished end face, and a metal film formed on the bonding face of the optical device and for bonding the optical device onto a substrate. The metal film includes a main covering portion covering a region except an end part of the bonding face on the side of the end face and an end part-covering portion covering the bonding face in the end part. A non-covered part, which is not covered by the metal film, is provided between the main covering portion and end part-covering portion.

7 Claims, 11 Drawing Sheets

(52) U.S. Cl.
CPC ...... *C04B 37/006* (2013.01); *C04B 2237/123* (2013.01); *C04B 2237/125* (2013.01); *C04B 2237/34* (2013.01); *C04B 2237/592* (2013.01); *C04B 2237/704* (2013.01); *C04B 2237/72* (2013.01); *G02F 2001/3505* (2013.01)

(58) Field of Classification Search
USPC .............................. 385/5, 14, 129, 131, 147
See application file for complete search history.

(56) References Cited

U.S. PATENT DOCUMENTS

| | | | |
|---|---|---|---|
| 2004/0147128 A1* | 7/2004 | Yui | H01L 21/7684 438/691 |
| 2007/0290279 A1* | 12/2007 | Imamizu | H01L 23/5329 257/411 |
| 2010/0226001 A1 | 9/2010 | Yoshino | |
| 2013/0306150 A1* | 11/2013 | Dounas | H01L 31/0463 136/261 |

FOREIGN PATENT DOCUMENTS

| | | | | |
|---|---|---|---|---|
| JP | 2005-183779 | * | 7/2005 | ......... H01L 21/3205 |
| JP | 2010-204505 A | | 9/2010 | |

OTHER PUBLICATIONS

International Search Report and Written Opinion for PCT Patent App. No. PCT/JP2014/071479 (Nov. 18, 2014) with English translation of the Search Report.

* cited by examiner

OPTICAL COMPONENT

TECHNICAL FIELD

The present invention relates to an optical component including a metal film for bonding the optical component to a substrate.

BACKGROUND ARTS

Non-linear optical crystal, such as lithium niobate or lithium tantalate single crystal, has a high secondary non-linear optical constant. When a periodic domain polarization inversion structure is formed in the above crystals, a second-harmonic-generation (SHG) device of a quasi-phase-matched (QPM) system can be realized. Further, when a waveguide is formed within this periodic domain inversion structure, a high-efficiency SHG device can be realized and further, applied to wide range of applications such as optical communication, medical science, photochemistry, and various optical measurements.

In the case that an SHG device is produced for example, it is necessary to form an optical waveguide inside of the device and to optically polish end faces, to which a fundamental wave is made incident and from which a harmonic wave is emitted. In patent document 1, the applicant disclosed that, after the SHG device is cut out, many devices are laminated in the direction thickness to obtain a laminated body and the end faces of the laminated devices are subjected to optical polishing. Further, according to the patent document 1, it is disclosed to prevent pyroelectricity during the optical polishing.

RELATED ARTS (Patent document 1) Japanese Patent Publication No. 2010-204,505A

SUMMARY OF THE INVENTION

Recently, the development of high-speed and high frequency optical fiber is accelerating further. It becomes necessary for various kinds of optical components to respond such development. On the viewpoint of stability and reliability, in the case that the optical component is bonded to a mounting substrate, a metal such as a solder is preferred than a resin. It has been thus mainstream to form a metal film for bonding on a main face of the optical component and to subject the metal film to metal bonding onto a separate mounting substrate with soldering or the like.

The present inventors tried to form a metal film for metal bonding on a bottom face of an optical device such as an SHG device, to subject incident and emitting faces of the optical device to end face polishing and to subject the metal film to metal bonding to a substrate. However, during the process, they encountered the following problems.

That is, when the end face of the optical device is subjected to optical polishing and the end face is rubbed with a polishing pad, fine winding-up may occur in the metal film and an electrode film may be peeled and floated. In the case that such peeling of the electrode film occurs, a desired bonding strength is not obtained after it is bonded to a mounting substrate or the like. The optical characteristics may be susceptible to deviations and long-term reliable test would not be satisfied, resulting in reduction of a production yield. The occurrence of the peeling of the metal film reached to about 20 percent of a total number to be tested.

Thus, the present inventors tried to retreat the metal film for bonding from the end face and to provide a non-covered part, where the metal film is not provided, between an edge of the metal film and end face, so that the peeling and floating of the metal film during the polishing of the end face is prevented.

However, in this case, it is proved that the following problems may occur. That is, the optical component is very small and it is needed to cut out many optical devices from a single wafer. Then, for each of the optical devices, there are limits on precision of patterning, precision of dimension in the cutting step and precision of dimensions by processing of the end face polishing. That is, the position of the non-covered part in the respective optical devices are usually deviated in several tens µm. Although this level of the positional shift is usually non-problematic, it may arise the problems as described above, in the case that the non-covered part is provided from the end face of the optical device. That is, as the width of the non-covered part is small, the non-covered part would not be left before the cutting-out and the end part is covered with the metal film to the end face, in a part of the optical devices. On the other hand, the width of the non-covered part would be large in another optical device.

The metal film is bonded to the separate substrate through metal bonding in the state that the optical device is mounted on the substrate. Heat generated in the optical device is thereby escaped through the metal film to perform the heat dissipation control. Such heat dissipation is not performed in the non-covered part. Here, in the case that the width of the non-covered part is changed among the optical devices, the degree of the heat dissipation is also changed among the optical devices, resulting in the deviation of performance.

An object of the present invention is, in an optical component bonded by metal bonding to a separate substrate through a metal film for the bonding, to prevent the peeling or floating due to winding-up of the metal film during polishing of an end face of the optical component.

An optical component of the present invention comprises:
an optical device comprising a bonding face including an end part and an optically polished end face; and
a metal film formed on the bonding face of the optical device and for bonding the optical device to a substrate;
wherein the metal film comprises a main covering portion covering a region other than the end part of the bonding face on the side of the end face and an end part-covering portion covering the bonding face in the end part; and
wherein the end part comprises a non-covered part which is not covered with the metal film.

According to the present invention, in an optical component bonded by metal bonding to a separate substrate through a metal film for bonding, the covered part by the metal film and the non-covered part are provided in the end part of its bonding face. Even in the case that the peeling or floating occurs due to winding-up of the covering portion in the end part during optical polishing, it is thereby possible to prevent that the peeling or floating of the metal film is propagated to the main covering part. At the same time, the covering part of the metal film is further provided in the end part, so that it becomes possible to assure metal bonding of the optical device and the separate substrate also in the end part. Even in the case that the position of the metal film is deviated among the respective optical devices, it is thereby possible to prevent the propagation of the peeling of the metal film to the main covering portion assuredly.

MODES FOR CARRYING OUT THE INVENTION

The present invention will be described further in detail, appropriately referring to the attached drawings.

Figures 1A, 1B, 1C:
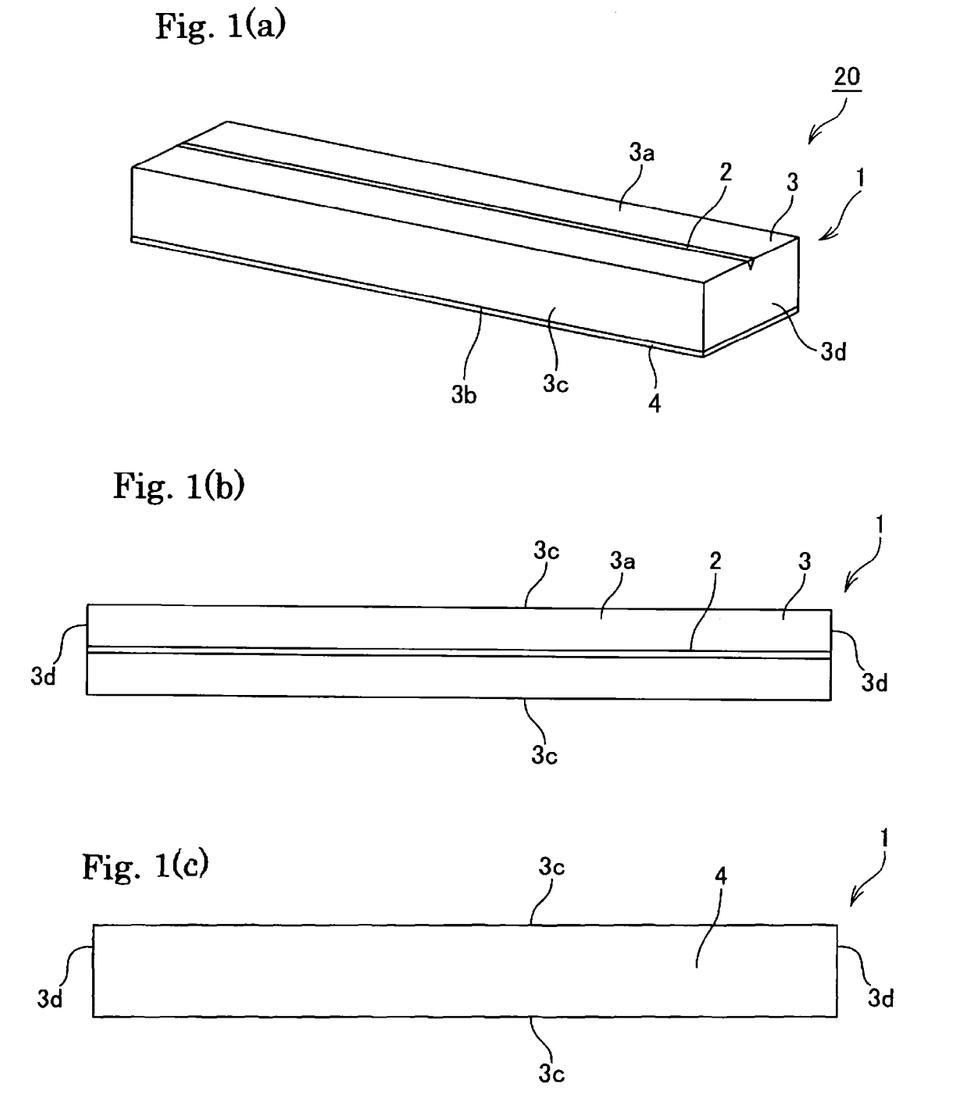
FIG. 1(a) is a perspective view schematically showing an optical component 20 according to a comparative example.
FIG. 1(b) is a plan view of the optical component 20.
FIG. 1(c) is a bottom view of the optical component 20.

The present inventors have studied mass production of an optical component 20 as shown in FIG. 1. According to the optical device 20 of the present example, a channel-type optical waveguide 2 is formed in a device main body 3. The device main body 3 includes a pair of main faces 3a and 3b, a pair of side faces 3c, and a pair of end faces 3d. According to the present example, the optical waveguide 2 is elongated between the pair of end faces 3d.

When this optical device is metal bonded to a separate substrate, it is necessary to make either one of the main faces 3a and 3b a bonding face and to form a metal film for bonding on the bonding face. According to the present example, a predetermined electrode is formed on the main face 3a and a metal film 4 is provided on the bottom face 3b on the opposite side. For stabilizing the bonding strength, the metal film 4 is provided over the whole face of the bottom face 3b.

However, when the end face 3d of the optical device 20 is subjected to optical polishing and the end face is rubbed with a polishing pad, in particular, fine winding-up may occur in the metal film such as Au film to cause floating and peeling of the metal film. The occurrence of such peeling of the metal film may reach about 20 percent of the total number.

Figure 2A:
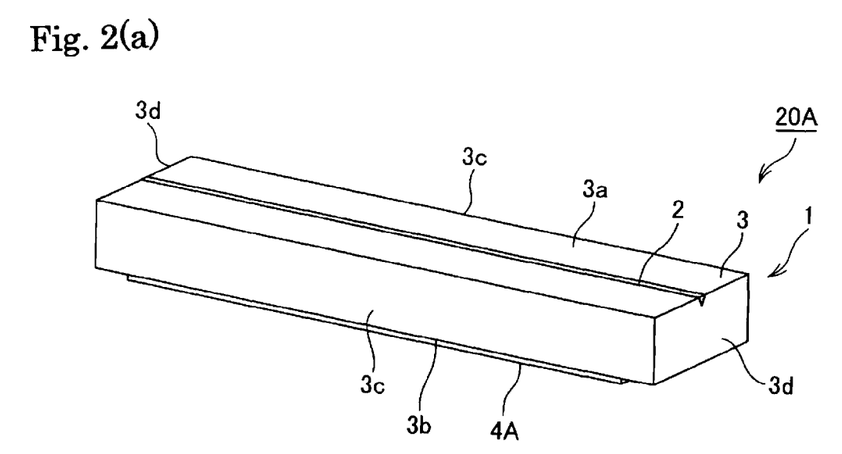
FIG. 2(a) is a perspective view schematic showing an optical component 20A according to a comparative example.
Figure 2B:
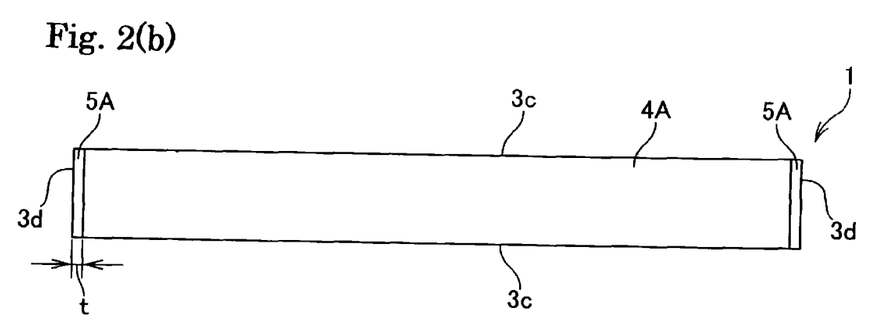
FIGS. 2(b) and 2(c) are bottom views of the optical component 20A, respectively.

Thus, as shown in FIG. 2, the inventors studied to make a metal film 4A for bonding distant from an end face 3d and to provide a non-covered part 5A, which is not covered with the metal film, between the edge of the metal film and the end face. That is, according to an optical device 20A of the present example, a predetermined electrode is formed on the main face 3a and the metal film 4A is provided on the bottom face 3c on the opposite side. However, the metal film 4A is not formed over the whole of the bottom face 3b. That is, the non-covered part 5A is provided, on which the metal film 4A is not formed, in the end part of the bottom face 3b on the side of each end face 3d. It would have been possible to prevent the peeling and floating of the metal film during the polishing of the end face 3d.

Figure 7A:
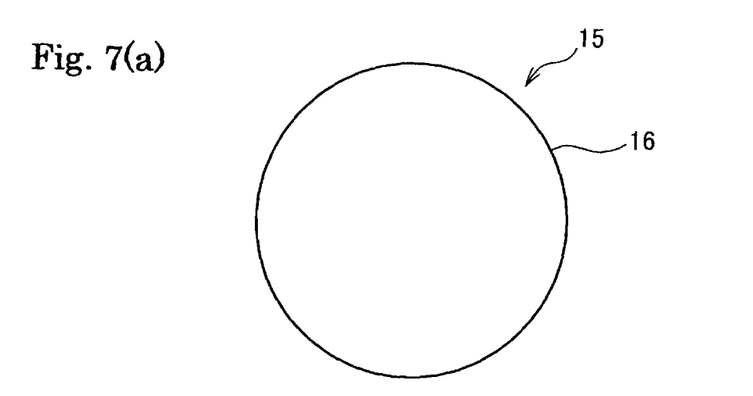
FIG. 7(a) is a plan view showing a wafer 15 with a metal film 16 provided thereon.

In this case, however, it is proved that the following problems occur. That is, the optical device is very small in size, so that it is necessary to cut out many optical devices from a single wafer. This point will be described further referring to FIG. 7. As shown in FIG. 7(a), a metal film 16 for bonding is provided on a wafer 15. A part of the metal film 16 is then removed by etching to form a pattern 17 for the non-covered part (refer to FIG. 7(b)). Thereafter, as shown in FIG. 7(c), the wafer is cut along cutting lines 18 and 19 vertically and horizontally to obtain the respective optical devices.

Here, it is necessary to cut out many optical devices 1 from the single wafer 15. However, there are limits on the precisions for photolithography for forming the non-covered part 5A, the dimensions for the cutting-out and dimensions of processing of polishing the end faces. The position of the non-covered part is thereby usually shifted by several tens μm. As a result, in the case that the non-covered part 5A is provided from the end face of the optical device, problems arise. That is, as the width t of the non-covered part 5A is small, if the dimensions of the cut end faces are slightly shifted, the non-covered part would not be left after the cutting-out so that the bottom face is covered by the metal film to the end face 3d.

Figure 2C:
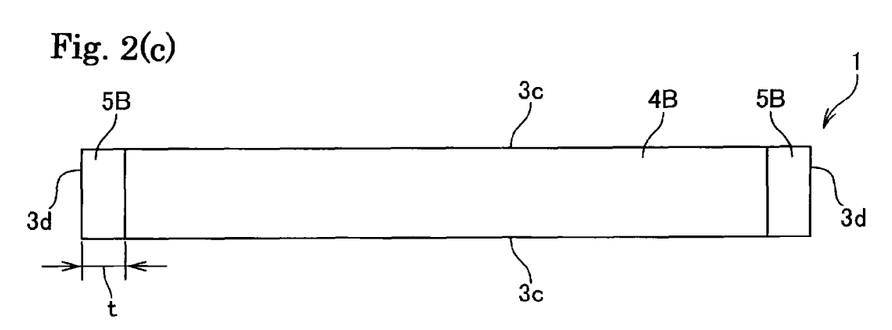

Here, as shown in FIG. 2(c), it was further studied that the width t of the non-covered part 5B is made sufficiently large, so that the non-covered part 5B is left adjacent to the end face 3d even when the position of the cutting-out is shifted. In this case, however, it is necessary to make the width t of the non-covered part large. The stability of the bonding is thereby deteriorated and heat dissipation from the optical device to the substrate is reduced in a region which is not bonded. As the width of the non-covered part 5B becomes large and the position for cutting-out is shifted, the width of the non-covered part 5B tends to become considerably large. The heat dissipation to the substrate is thus particularly lowered in the end part, resulting in deviations in various kinds of optical properties.

Figure 3A:
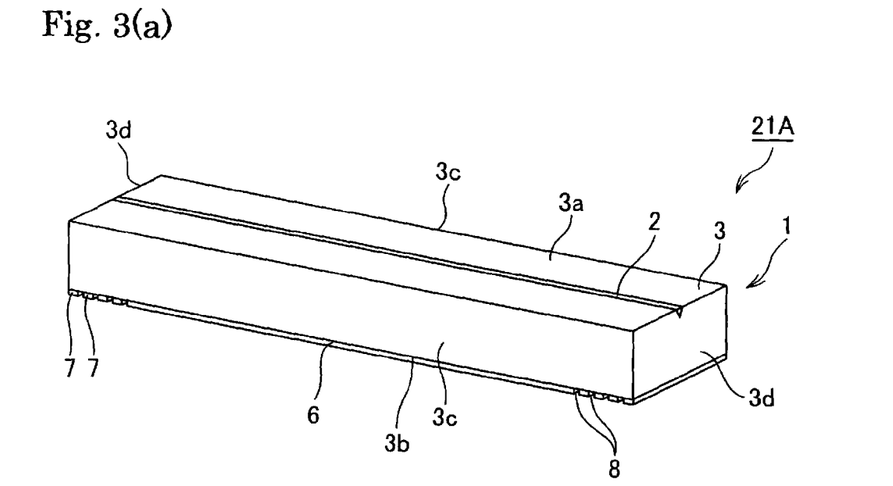
FIG. 3(a) is a perspective view schematically showing an optical component 21A according to an inventive example.
Figure 3B:
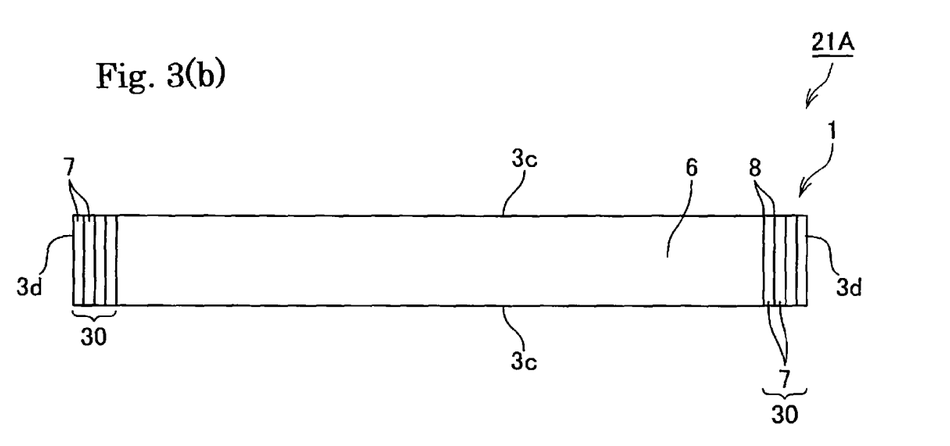
FIG. 3(b) is a bottom view showing the optical component 21A.
Figure 4A:
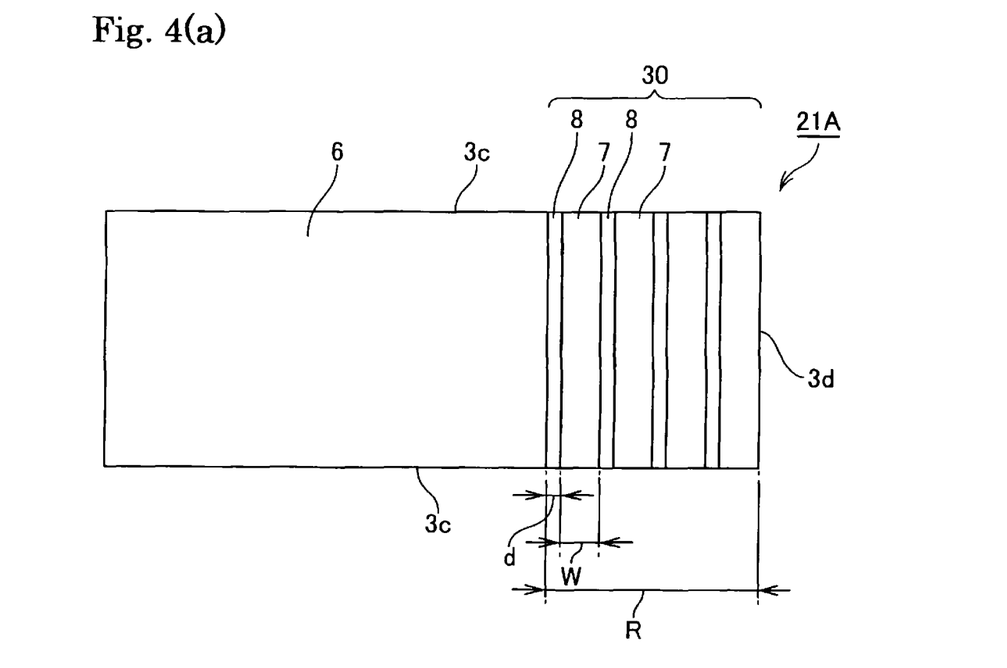
FIG. 4(a) is an enlarged view showing a bottom face of the optical component 21A.
Figure 4B:
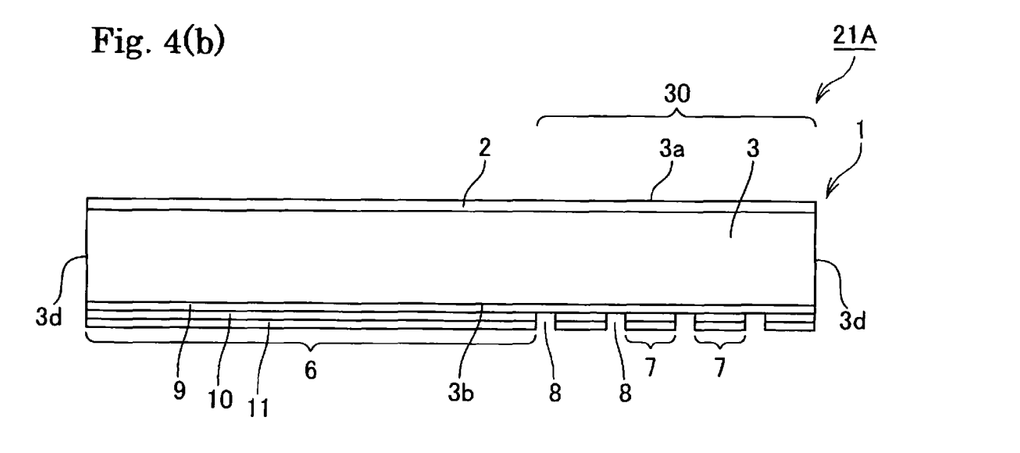
FIG. 4(b) is a side view showing an end part of the optical component 21A.

FIGS. 3 and 4 show an optical device 21A according to the present invention.

According to the optical device 21A of the present example, a channel-type optical waveguide 2 is formed in a device main body 3. The device main body 3 includes a pair of main faces 3a and 3b, a pair of side faces 3c and a pair of end faces 3d. According to the present example, an optical waveguide 2 is elongated between a pair of end faces 3d.

According to the present example, a predetermined electrode is provided on the main face 3a, the bottom face 3b on the opposite side is made a bonding face, and a metal film is provided on the bottom face. Here, as shown in FIGS. 3(b)

and 4, a main covering portion 6 is formed in a region except an end part 30 of the bottom face 3b on the side of end face 3d. At the same time, in each of the end parts 30 of the bottom face on the sides of end face 3d, a plurality of rows of elongate and stripe-shaped end part-covering portions 7 are arranged from the main covering portion 6 to the end face 3d. A slit-shaped non-covered part 8 is formed between the adjacent end part-covering portions 7, and a slit-shaped non-covered part 8 is formed between the main covering portion 6 and the end part-covering portion 7 at the innermost side.

According to the present embodiment, the covering portion 7 of the metal film is provided in the end part 30 of the bonding face 3b and the non-covered part 8 is provided between the end part-covering portion 7 and main covering portion 6. Even when the end part-covering portion 7 is wound up during the optical polishing to generate the peeling or floating of it, it becomes possible to prevent the propagation of the peeling or floating to the main covering portion 6. At the same time, by further providing the covering portion 7 of the metal film in the end part 30, it is possible to assure the metal bonding between the optical component 1 and separate substrate further in the end part. Thus, even when the position of the metal film is deviated among the optical components 1, a single one or plural ones among a plurality of the slits 8 is intervened between the covering portion 7 and main covering portion 6, so that it is possible to prevent the propagation of the peeling into the main covering portion.

Figure 5A:
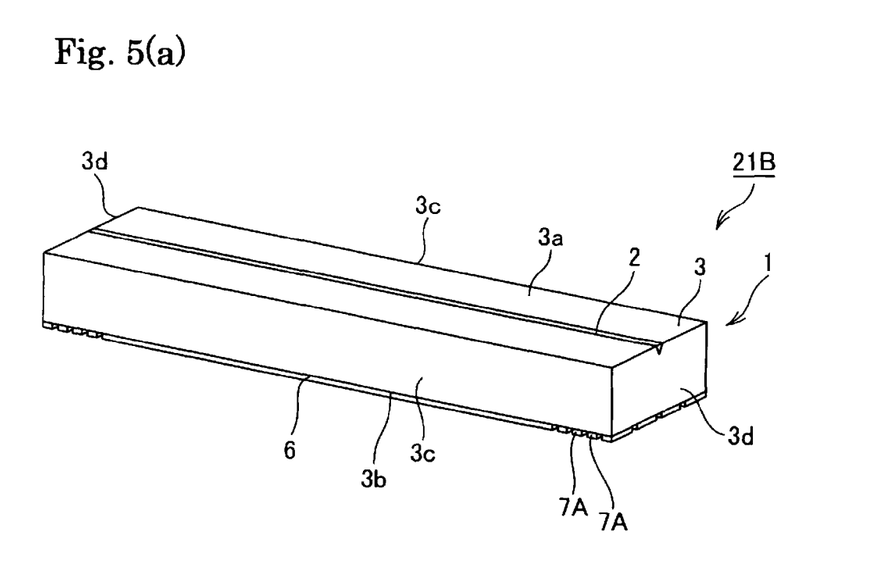
FIG. 5(a) is a perspective view schematically showing an optical component 21B according to an inventive example.
Figure 5B:
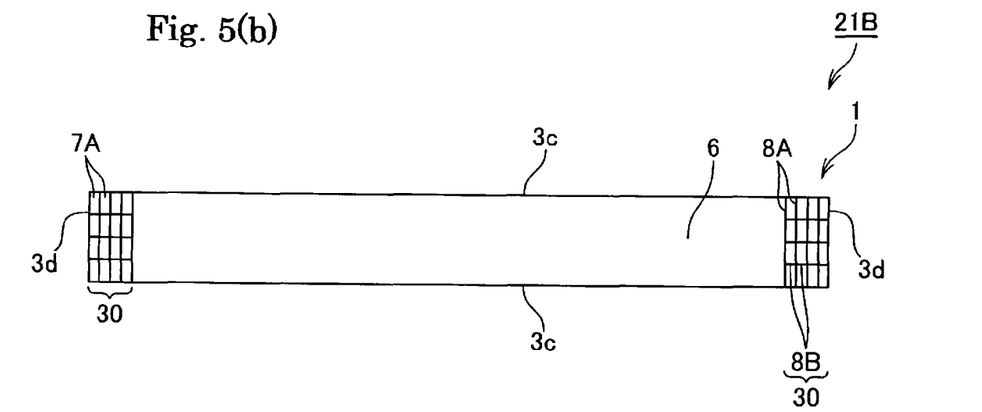
FIG. 5(b) is a bottom view showing the optical component 21B.
Figure 6A:
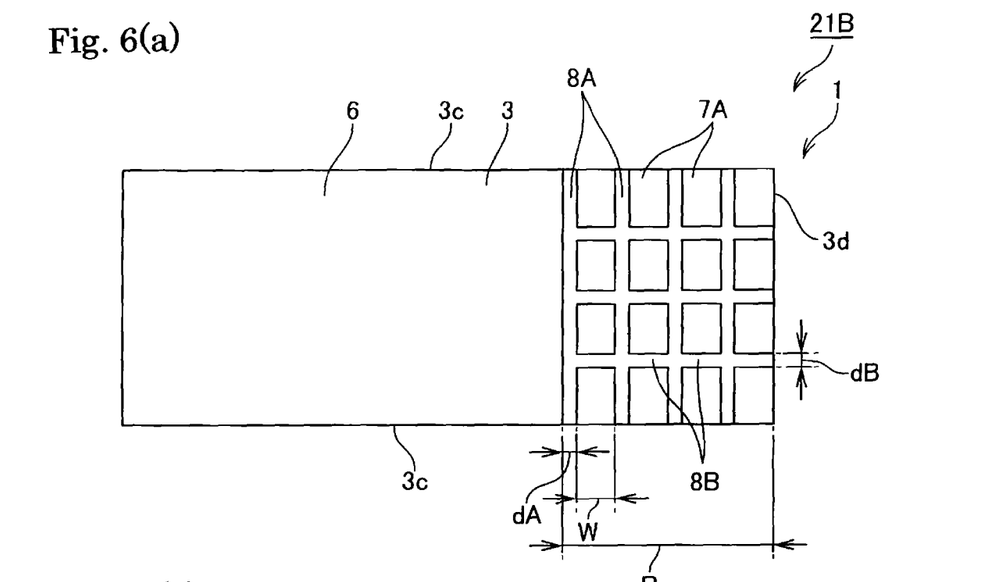
FIG. 6(a) is an enlarged view showing an end part of a bottom face of the optical component 21B.
Figure 6B:
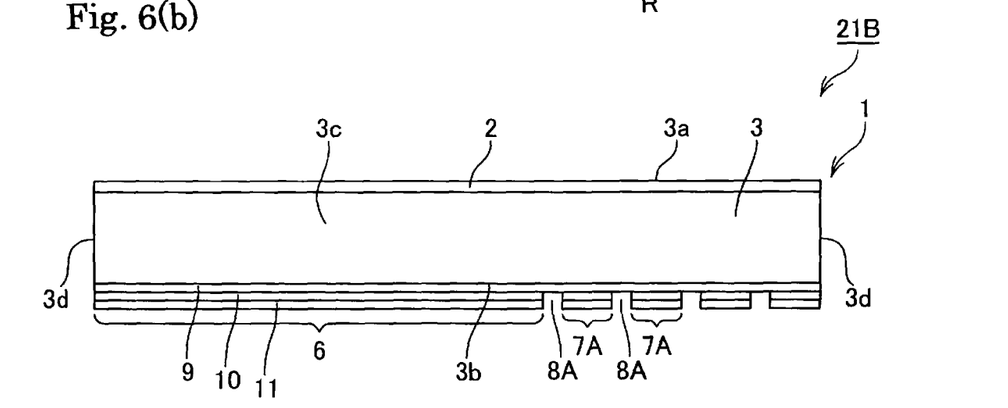
FIG. 6(b) is a side view showing an end part of the optical component 21B.
Figure 6C:
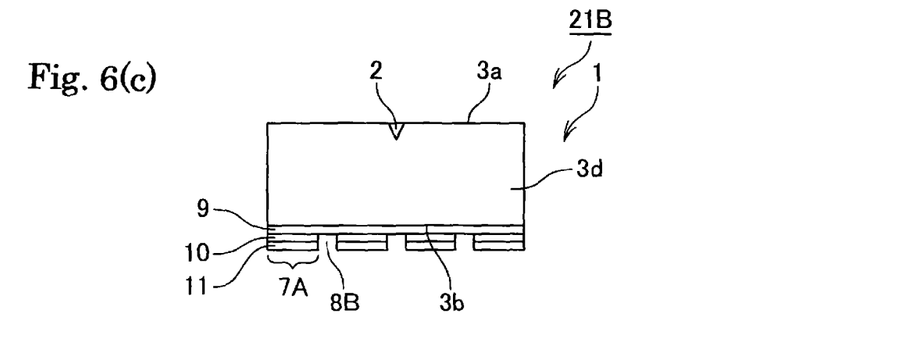
FIG. 6(c) is a view showing the optical component 21B from an end face 3d.

According to an optical component 21B shown in FIGS. 5 and 6, a channel-type optical waveguide 2 is formed in the device main body 3. The device main body 3 includes a pair of main faces 3a and 3b, a pair of side faces 3c and a pair of end faces 3d. According to the present example, the optical waveguide 2 is extended between the pair of the end faces 3d.

According to the present example, a predetermined electrode is formed on the main face 3a, the bottom face 3b on the opposite side is made a bonding face, and the metal film is provided on the bottom face. Here, as shown in FIGS. 5(b) and 6, the main covering portion 6 is formed in the region except the end part 30 of the bottom face 3b on the side of the end face 3b. At the same time, at each of the end parts on the side of the end face 3d of the bottom face, a plurality of rows and columns of tetragonal-shaped end face-covering portions 7A are arranged from the main covering portion 6 toward the end face 3d and are arranged between the pair of the side faces 3c, respectively. A slit-shaped non-covered part 8A is formed between the end-face covering portions 7A adjacent to each other in the longitudinal direction of the bottom face. Further, a slit-shaped non-covered part 8A is formed between the main covering portion 6 and the end part-covering portion 7 at the innermost side. A slit-shaped non-covered part 8B is formed between the end part-covering portions 7A adjacent to each other in the width direction of the bottom face.

According to the present embodiment, the covering portion 7A of the metal film is provided in the end part 30 of the bonding face 3b and the non-covered part 8A is provided between the end part-covering portion 7A and the main covering portion 6. In the case that the peeling or floating occurs due to winding-up of the end part-covering portion 7 during the optical polishing, it is thereby possible to prevent the propagation of the peeling or floating toward the main covering portion 6. At the same time, the covering portion 7A of the metal film is provided in the end part, so that metal bonding can be assured between the optical component 1 and separate substrate further in the end part. Thus, even in the case that the position of the metal film is shifted depending on the respective optical components 1, one or more of a plurality of the slits 8A is intervened between the main covering portion 6 and the covering portion 7 on the side of the end face. It is thereby possible to prevent the propagation of peeling of the main covering portion assuredly. Further, the propagation of peeling toward the width direction of the bottom face can be further prevented by the slit-shaped non-covered parts 8B.

Each of components of the present invention will be described further in detail.

The kind of the optical device is not particularly limited, as long as it performs an optical function. Specifically, it includes a wavelength converting device, an optical intensity modulator, an optical phase modulator, an optical switching device or the like.

The kind of the optical waveguide formed in the optical device is not limited, and includes a slab waveguide and channel type waveguide. Further, the kind of the waveguide may be an inner diffusion type optical waveguide such as titanium diffusion type or a ridge type optical waveguide. Further, according to a preferred embodiment a periodic polarization inversion structure is formed at least in the optical waveguide of the optical device.

The present invention is particularly suitable to a wavelength converting device. The reasons are as follows. According to the wavelength converting device, the temperature is deviated in the direction of the waveguide due to heat generated by absorption of light accompanied with wavelength conversion. As the temperature deviation occurs, due to the temperature dependency of the refractive index of the material, the periodic structure for performing the wavelength conversion would not be uniform in the longitudinal direction, resulting in reduction of the wavelength conversion efficiency. For preventing the reduction of efficiency and temperature deviation, it is necessary to bond the bottom face of the device to the mounting substrate or the like so that the number of the positions of the floating is low.

The optical device includes the bonding face and the end faces optically polished. According to a preferred embodiment, the optical device is plate-shaped and includes a pair of main faces opposing to each other. The main face means a surface having a relatively larger area than the other faces. In this case, one of the main faces functions as the bonding face. Further, according to a preferred embodiment, the optical device includes a pair of the side faces opposing to each other. In this case, according to a preferred embodiment, the side faces are not subjected to optical polishing.

According to the present invention, one of the main faces is used as the bonding face for metal bonding. According to the examples shown in FIGS. 3 to 6, the bottom face 3b is used as the bonding face. In the case that a controlling electrode is provided on the side of the bottom face 3b, however, the surface 3a may be used as the bonding face.

Generally, the side faces are formed by a cutting step such as dicing and it is not subjected to precise optical polishing as the end faces. Although tipping of about 10 μm may occur locally on the side face after the dicing, the winding-up, peeling and floating of the metal film were not observed when it was performed a peeling test with a tape on such positions. The present invention solves the unknown problems such as the winding-up, floating and peeling of the bonding metal film starting from the end face subjected to the optical polishing.

The optical device may be formed as an integrated substrate 3. However, the inner structure of the optical device is not particularly limited. For example, the optical device may include a supporting body, an optical substrate made of a ferroelectric material, and an adhesive layer adhering the supporting body and the optical substrate.

The optical component of the present invention includes the metal film used for bonding the optical device to the substrate.

The metal film for the bonding referred to therein means a metal film on the uppermost surface contacting the metal for bonding, and does not include an underlying film or an intermediate film under the metal film for the bonding.

For example, according to the examples shown in FIGS. 3 to 6, on the bottom face 3b of the optical device, the underlying film 9, the intermediate film 10 and the metal film 11 for bonding are formed in the order. The underlying film 9 and intermediate film 10 may be provided for strongly bonding the metal film 11 for bonding to the optical device 1. According to the examples shown in FIGS. 3 to 6, the main covering portion 6 and end part-covering portions 7, 7A mean portions covered by the metal film 11, respectively. On the other hand, the underlying film 9 is exposed in the non-covered parts 8, 8A and 8B. The intermediate film 10 may be further exposed in the non-covered parts 8, 8A and 8B.

Although an optical material forming the optical device is not particularly limited, it includes lithium niobate, lithium tantalate, lithium niobate-lithium tantalate solid solution, potassium lithium niobate, KTP, GaAs, quartz, $K_3Li_2Nb_5O_{15}$, $La_3Ga_5SiO_{14}$ or the like.

In the optical material, for further improving the resistance against optical damage, it may be contained one or more metal element selected from the group consisting of magnesium (Mg), zinc (Zn), scandium (Sc) and indium (In). Magnesium is most preferred. A rare earth element may be contained in the ferroelectric single crystal as a dopant. The rare earth element functions as an additive for laser oscillation. Such rare earth element may more preferably be Nd, Er, Tm, Ho, Dy or Pr.

The material of the metal film for bonding includes gold, nickel, copper or the like, and gold is preferred for obtaining stable bonding. In the case of using copper or nickel, its surface may be susceptible to oxidation so that the bonding may become difficult. Further, the material of the underlying layer may preferably be chromium, titanium or copper considering that a gold film is formed on the surface. Further, in the case that the intermediate layer is provided, the material may preferably be nickel or platinum.

In the case that the intermediate layer is provided, it is effective for preventing the electrolytic corrosion. In the case that, however, a member of mounting the optical component is subjected to hermetic seal after the metal bonding, the combination of the two kinds of metals of the metal film and underlying film can prevent the electrolytic corrosion.

As a method of the metal bonding, direct bonding of the metals is listed in addition to soldering.

According to the present invention, the metal film for bonding includes the main covering portion, covering the region except the end part of the bonding face on the side of end face, and the end part-covering portion covering the bonding face in the end part. The end part includes the non-covered part which is not covered with the metal film.

At least one end part-covering portion is necessary and a plurality of the end part-covering portions may be preferably provided. Further, at least one non-covered part is necessary and a plurality of the non-covered parts may be preferably provided. It is thereby possible to facilitate the absorption of adverse effects due to the positional shift or deviation resulting from the processing.

According to a preferred embodiment, the non-covered part has a shape of a slit. In this case, on the viewpoint of preventing the propagation of the peeling of the metal film, the width d, dA, dB of the non-covered part may preferably be 1 μm or larger and more preferably be 3 μm or larger. Further, on the viewpoint of stability and heat dissipation of the metal bonding, the width d, dA, dB of the non-covered part may preferably be 10 μm or smaller and more preferably be 5 μm or smaller.

According to a preferred embodiment, the non-covered part extends from one side face to the other side face of the optical device. FIGS. 3 to 6 relate to this embodiment. It is thereby possible to effectively prevent the propagation of the peeling of the metal film from the end face to the main covering portion.

Further, according to a preferred embodiment, the non-covered part extends from the main covering portion to the end face. FIGS. 5 and 6 relate to this embodiment. It is thereby possible to prevent the propagation of the peeling of the metal film toward the side face can be further prevented, which is more preferred.

Further, according to a preferred embodiment, a plurality of end part-covering portions are formed in the end part, and each of the end part-covering portions is surrounded with the non-covered part. FIGS. 5 and 6 relate to this embodiment. By surrounding the end part-covering portion by the non-covered part, it is possible to realize the bonding in the end part more assuredly.

The planar shape of each of the end part-covering portions is stripe-shaped in the example shown FIGS. 3 and 4 and tetragonal in the example shown in FIGS. 5 and 6. However, the planar shape of each of the end part-covering portions is not limited to stripe shape or tetragonal shape, and may be a polygonal shape such as triangle, hexagonal or the like or circular shape such as true circle or ellipse.

The width W of each end part-covering portion may preferably be 3 μm or larger and more preferably be 5 μm or larger, on the viewpoint of assuring the metal bonding of the optical device. Further, the width W of each of the end part-covering portions may preferably be 20 μm or smaller and more preferably be 10 μm smaller, on the viewpoint of assuring a space for the non-covered part.

The distance R between the end face 3d and the main covering portion 6 may preferably be 50 μm or larger and more preferably be 100 μm or larger, on the viewpoint of compensating the positional deviation of the non-covered part due to the dimension precision. Further, the distance R may preferably be 200 μm or smaller and more preferably be 150 μm or smaller, on the viewpoint of making the metal bonding strength stable and facilitating the heat dissipation from the optical device to the substrate.

Further the optical polishing may preferably be made as follows.

The device is cut out from the wafer by dicing, and then the end face is lapped by steps while the sizes of diamond abrasives used are made smaller. As the finishing, CMP (chemical mechanical polishing) is performed using colloidal silica abrasives.

EXAMPLES

Comparative Example 1

It was produced the optical device shown in FIG. 1.

However, the optical device 1 was made of lithium niobate, a periodic domain inversion structure was formed in the optical device 1, and the channel-type optical waveguide 2 of ridge type was formed therein.

Specifically, an interdigitated periodic electrode of a period of 6.6 µm was formed by photolithography on a substrate of 5° off y-cut MgO-doped lithium niobate and of a thickness of 0.5 mm. After an uniformed electrode was formed on the whole surface of the bottom face of the substrate. Pulse voltage was applied to form the periodic domain inversion structure. Then, it was formed an under clad of $SiO_2$ and of a thickness of 0.6 µm by sputtering.

After an adhesive was applied on a substrate of lithium niobate and of a thickness of 0.5 mm, it was then adhered onto the MgO-doped lithium niobate substrate as described above. The surface of the MgO-doped lithium niobate substrate was ground and polished to a thickness of 3.7 µm. After the optical waveguide was formed in the thus obtained substrate, an over clad of $SiO_2$ and of a thickness of 0.6 µm was formed by sputtering.

On the whole surface of the bottom face 3b of the thus obtained optical device 1, a chromium film of a thickness of 500 angstrom, a nickel film of a thickness of 2000 angstrom and a gold film of a thickness of 500 angstrom were formed by sputtering. The gold film corresponded to the metal film for bonding, the chromium film corresponded to the underlying film and the nickel film corresponded to the intermediate film. However, the chromium film, nickel film and gold film were formed on the whole surface of the bottom face 3b of the optical device 1.

The thus obtained wafer was cut out by a dicer as shown by reference numeral 18 shown in FIG. 7(c) to obtain elongate cut products (having a dimension of about 10 mm×about 30 mm. In the case that it was too long, it was then cut into two or three pieces so that the length of the cut product was adjusted at 30 mm). The cut product was fixed on a jig for polishing end face, and its end face was polished by using the diamond abrasives and colloidal silica abrasives. Anti-reflection films were then formed on the both end faces. The elongate cut products were further cut as shown by reference numeral 19 to obtain optical components, each having a width of 0.8 mm.

Figure 8:
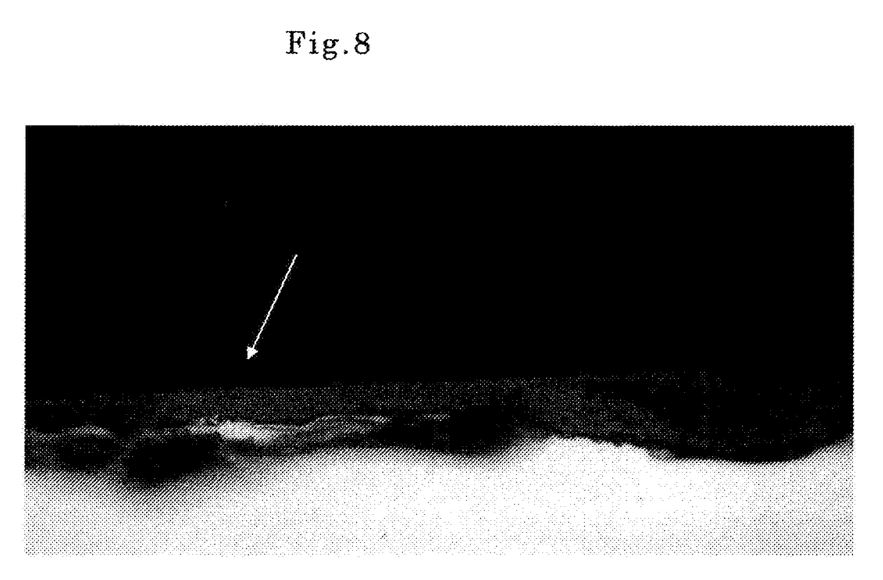
FIG. 8 is a photograph showing the state of peeling of a metal film in an optical component according to a comparative example.

FIG. 8 is a photograph obtained by observing the vicinity of the end face of the thus obtained optical component viewed from the side of the metal film. The end face is elongated horizontally in the central part of FIG. 8. The black part over the end face corresponds to a space. In the lower side of the end face (bottom face of the optical component), metals (gold, nickel, chromium) are not present, and the lithium niobate substrate material is exposed to form peeled parts, under which the bright gold film is left.

Figure 9:
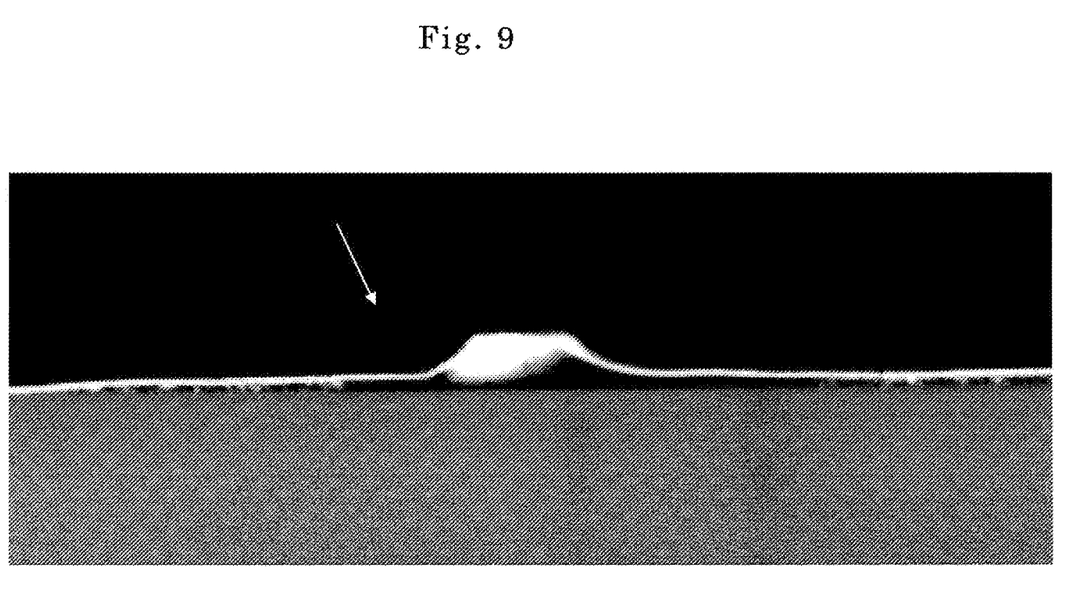
FIG. 9 is a photograph showing the state of peeling of a metal film in an optical component according to a comparative example.

FIG. 9 shows a photograph observing the end face of the thus obtained optical device after the cutting. A protrusion was observed in a region shown by an arrow, indicating that the chromium film (underlying film) was wound up due to the optical polishing. It further indicates that the nickel film as the intermediate layer and the underlying chromium film are peeled off accompanied with the winding-up of the uppermost gold film.

Comparative Example 2

The optical component was produced according to the same procedure as the Comparative Example 2. However, according to the present example, as shown in FIG. 2(b), the non-covered part 5A was formed in the end part of the bottom face to expose the chromium film.

According to the present example, it was proved that it was necessary to make the width t of the non-covered part 50 µm or larger so that the non-covered part was left in the end part and the end face could be polished at a high yield.

On the other hand, in the case that the width t of the non-covered part is made 50 µm or larger, the parts having the Cr regions whose widths are smaller and larger are subjected to processing during the end face polishing step. Particularly, the non-covered part having a considerably large width may be formed, so that the deviation of properties after the bonding are made considerable among the optical components produced. Particularly, in a region where the wavelength converted light is strongly emitted at the side of emission, as the width of the non-covered part is large, the region which are is bonded becomes large to deteriorate heat dissipation into the substrate. Such region does not contribute to the wavelength conversion to deteriorate the wavelength conversion efficiency.

Example 1

The optical component was produced according to the same procedure as the Comparative Example 1. However, according to the present example, as shown in FIGS. 3 and 4, the non-covered parts 8 and end part-covering portions 7 were formed in the end part of the bottom face on the side of end face to expose the chromium film. 21 stripes of the non-covered parts 8, each having a width of 2 µm, were formed. Further, 20 stripes of the end part-covering portions, each having a width of 6 µm, were formed.

Figure 7B:
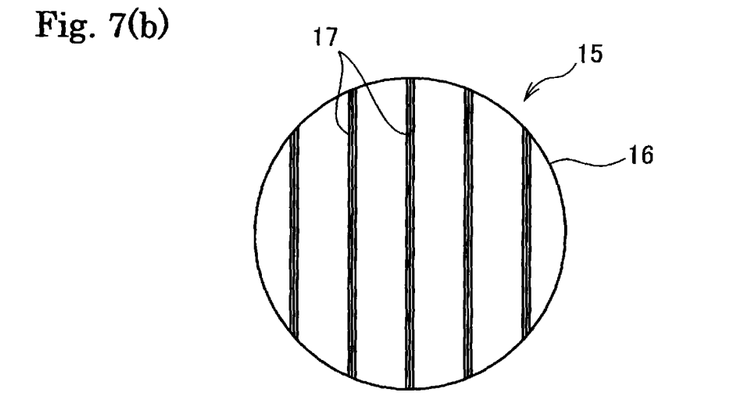
FIG. 7(b) shows the wafer 15 with a non-covered part 17 provided.
Figure 7C:
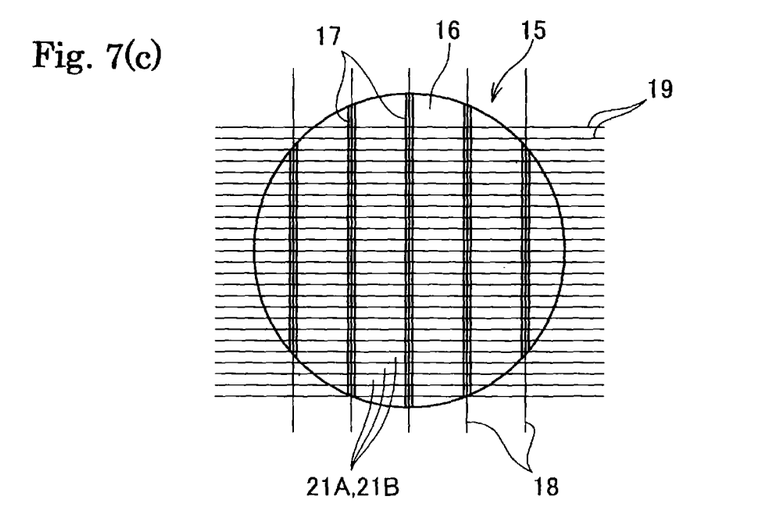
FIG. 7(c) shows cutting lines 18 and 19 on the wafer 15.

Such pattern of the metal films could be easily patterned in a single step for a plurality of the optical components, by performing the patterning in the wafer as shown by numeral 17 shown in FIG. 7(b).

The results of observation of the thus obtained optical components were shown.

Figure 10:
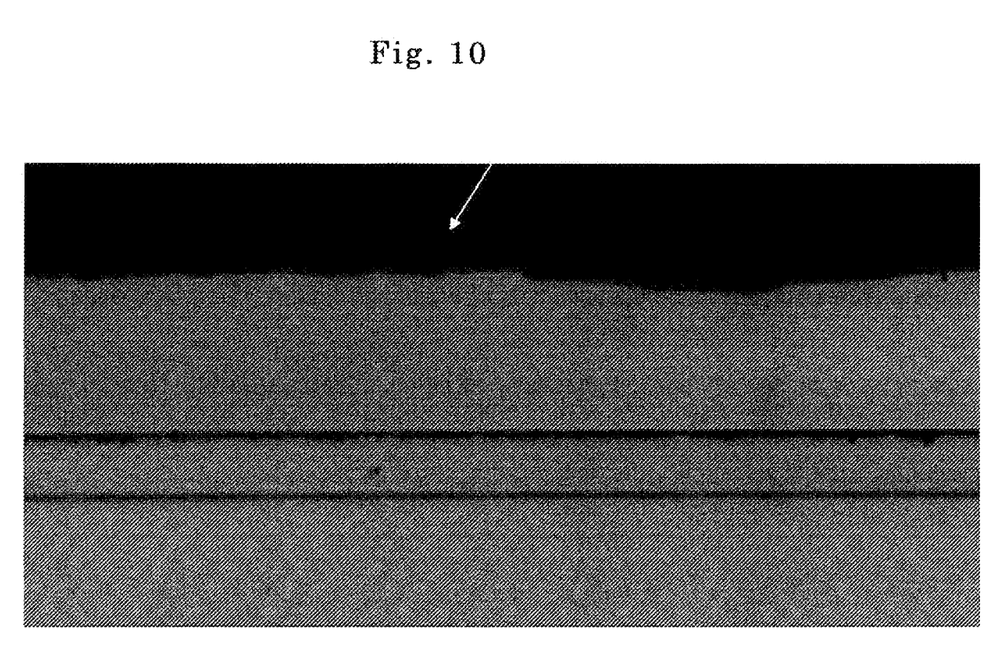
FIG. 10 is a photograph showing positions, where peeling of the metal film occurred, in the optical component of the inventive example.
Figure 11:
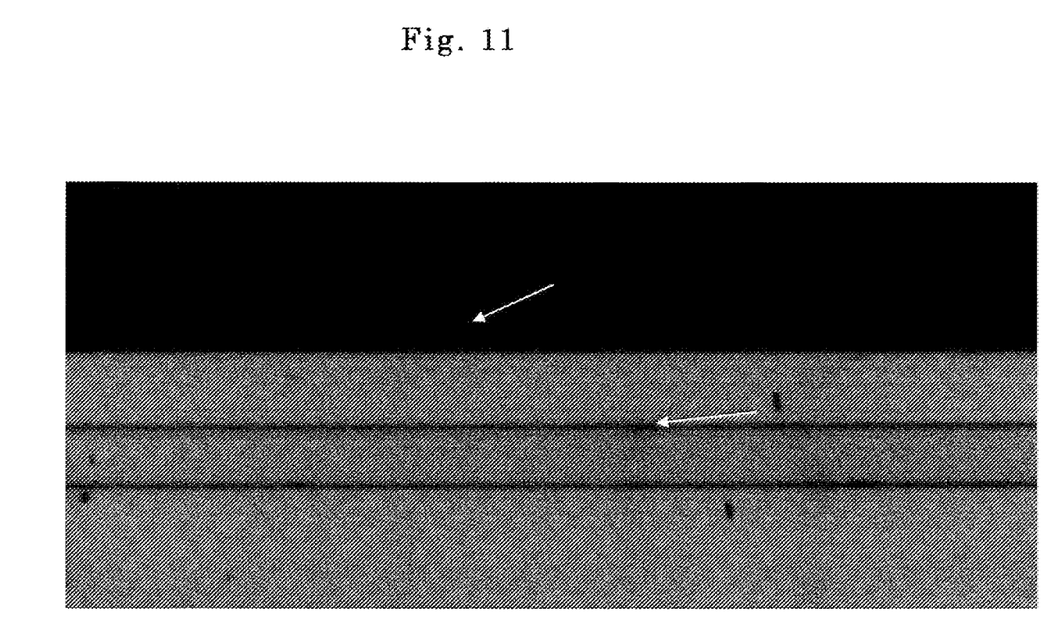
FIG. 11 is a photograph showing positions, where peeling of the metal film did not occur, in the optical component of the inventive example.

FIG. 10 is a photograph showing the part with the peeling at the end face, and FIG. 11 is a photograph showing the part which could be polished without causing the peeling of the metal film at the end face.

After the optical component was subjected to end face polishing, as shown in FIG. 10, in a part of the devices, the peeling and winding-up of the gold film starting from the end face was observed. The arrow indicates the peeled parts. Further, according to the photograph shown in FIG. 10, the end part is device into three parts. The uppermost part is the end part-covering portion 7, the underlying part is the non-covered part 8, and the lowermost part is the end part-covering portion 7. This is considered that, after the end face polishing, the soft Au film is cleaved by a polishing pad to cause the winding-up of the Au film. At the positions where the Au film was wound, the underlying nickel film and chromium film were also wound together with the Au film.

Besides, FIG. 11 is a photograph showing the state that the peeling was not observed in the vicinity of the end face.

In the case that a peeling test was performed in the region where the gold film and the like were peeled due to the end face polishing, the peeling is propagated in the end part-covering portions 7 where the pattern of the gold film and the like are left. However, such peeling is terminated in the non-covered parts 8 composed of the nickel and chromium films only, and the peeling is not progressed any more. Although the reason is not clearly understood, it is speculated that the adhesion strength of the Au film and the underlying metal film is stronger than the adhesion strength of the chromium film and the substrate of lithium niobate, so that the adhesion of the Au film and the underlying film would help the propagation of the peeling.

It was tried to bond the optical component exhibiting the peeling at the end face to a separate package substrate by soldering. As a result, although it could not be bonded in the region where the peeling of the gold film was observed, such region was very small in the order of several μm from the end face, so that strong and stable bonding could be obtained. Further, the wavelength converting device was evaluated after the bonding to prove that its efficiency of wavelength converting performance was high.

Example 2

The optical component was produced according to the same procedure as the Comparative Example 1, However, according to the present example, as shown in FIGS. 5 and 6, the non-covered parts 8A, 8B and end part-covering portions 7A were formed in the end part of the bottom face in the side of the end face, so that the chromium film was exposed. 21 stripes of the non-covered parts 8A and 101 stripes of the non-covered parts 8B, each having a width of 2 μm, were formed, respectively. Further, 20 rows and 100 columns of the end part-covering portions 7A, each having a dimension of 6 μm×6 μm, were formed.

By providing such slits on the bottom face of the optical device, the propagation of the peeling of the metal film from the polished part can be prevented in longitudinal and horizontal directions. It could be obtained the stable bonding and stable performance of the wavelength converting device.

The invention claimed is:

1. An optical component comprising:
   an optical device comprising a bonding face including an end part, an optically polished end face, a main face opposing said bonding face and a pair of side faces opposing each other; and
   a metal film formed on said bonding face of said optical device and for bonding said optical device to a substrate;
   wherein said metal film comprises a main covering portion covering a region other than said end part of said bonding face on the side of said end face and end part-covering portions covering said bonding face in said end part;
   wherein said end part-covering portions are arranged in a width direction of said bottom face between said side faces; and
   wherein said end part comprises slit-shaped non-covered parts which are not covered with said metal film, said slit-shaped non-covered parts being provided between said end part-covering portions adjacent to each other along said width direction.

2. The optical component of claim 1, wherein said optical device comprises an optical waveguide formed therein.

3. The optical component of claim 1, wherein said optical component comprises a periodic domain inversion structure formed therein.

4. The optical component of claim 1, wherein said metal film comprises a gold film.

5. The optical component of claim 1, further comprising an underlying film formed between said metal film and said bonding face, and wherein said underlying film is exposed in said non-covered part.

6. The optical component of claim 1, wherein said optical device comprises a supporting body, an optical substrate comprising an optical material, and an adhesive layer adhering said supporting body and said optical substrate.

7. The optical component of claim 1, wherein said end part further comprises an additional slit-shaped non-covered part which is not covered with said metal film, said additional slit-shaped non-covered part being provided between said end part-covering portions and said main covering portion.

* * * * *